(12) United States Patent
Gu (10) Patent No.: US 11,161,561 B1
(45) Date of Patent: Nov. 2, 2021

(54) HORIZONTAL WALL-MOUNTED BICYCLE RACK

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 0 days.

(21) Appl. No.: 17/158,002

(22) Filed: Jan. 26, 2021

(51) Int. Cl.
*B62H 3/12* (2006.01)
*B62H 3/10* (2006.01)

(52) U.S. Cl.
CPC ............ *B62H 3/12* (2013.01); *B62H 3/10* (2013.01)

(58) Field of Classification Search
CPC .......... A47F 5/08; A47F 5/0876; B62H 3/00; B62H 3/02; B62H 3/04; B62H 3/10; B62H 3/12; B60R 9/06; B60R 9/10
See application file for complete search history.

(56) References Cited

U.S. PATENT DOCUMENTS

| | | | | |
|---|---|---|---|---|
| 5,447,241 A | * | 9/1995 | Bureau | B62H 3/02 211/18 |
| 5,842,581 A | * | 12/1998 | Graefe | B25H 1/0014 211/17 |
| 5,887,461 A | * | 3/1999 | Heffley | E05B 71/00 70/18 |
| 6,494,327 B2 | * | 12/2002 | Huang | A47F 5/0892 211/107 |
| 6,983,853 B1 | * | 1/2006 | Fickett | A47F 5/04 211/18 |
| 7,055,725 B1 | * | 6/2006 | Kolda | B60R 9/06 224/497 |
| 7,669,822 B2 | * | 3/2010 | Kluge | F16B 45/02 248/308 |
| 8,047,492 B2 | * | 11/2011 | Wang | B62H 3/12 248/307 |
| 8,573,456 B2 | * | 11/2013 | Farber | B60R 9/06 224/504 |
| 8,820,543 B2 | * | 9/2014 | Huang | B62H 3/12 211/18 |
| 10,513,219 B1 | * | 12/2019 | Hassler | B60D 1/58 |
| 10,750,859 B1 | * | 8/2020 | Fickett | A47B 55/02 |
| 10,822,045 B1 | * | 11/2020 | Shen | B62H 3/02 |
| 11,046,380 B1 | * | 6/2021 | Gu | B62H 3/08 |
| 11,091,099 B1 | * | 8/2021 | Shen | B60R 9/06 |
| 2004/0217239 A1 | * | 11/2004 | Chuang | F16M 11/28 248/125.8 |

(Continued)

*Primary Examiner* — Patrick D Hawn (57) ABSTRACT

A horizontal wall-mounted bicycle rack includes a fixing main body, an extension assembly, swingable arms and an adjusting assembly. The adjusting assembly can be controlled to swing the swingable arms to appropriate angles, so that a bicycle can be stably hung on the horizontal wall-mounted bicycle rack. When not in use, the horizontal wall-mounted bicycle rack can be folded for stowing, the extension assembly can be pivoted relative to the fixing main body about an axle, and after the extension assembly or the swingable arm is pushed, a status of the extension assembly is changed from the lateral extension to the upward extension which is at a stowing position. At the stowing position, the extension assembly is in an upward extension status, so that the extension assembly is not protruded on the wall to prevent from affecting other's activity and danger of accidental collision.

6 Claims, 7 Drawing Sheets

(56) References Cited

U.S. PATENT DOCUMENTS

| | | | |
|---|---|---|---|
| 2007/0256989 A1* | 11/2007 | Steadman | B62H 3/06 211/21 |
| 2013/0270201 A1* | 10/2013 | Vineyard | B62H 3/06 211/21 |
| 2015/0309532 A1* | 10/2015 | Sapper | F16M 11/08 211/26 |
| 2017/0253188 A1* | 9/2017 | Shen | B60R 9/10 |
| 2018/0134229 A1* | 5/2018 | Shen | B60R 9/06 |
| 2020/0353611 A1* | 11/2020 | Smith | B62H 3/02 |

* cited by examiner

HORIZONTAL WALL-MOUNTED BICYCLE RACK

BACKGROUND OF THE INVENTION

1. Field of the Invention

The present invention is related to a wall-mounted rack, and more particularly to a wall-mounted rack for hanging bicycle rack at a position close to a wall.

2. Description of the Related Art

In general, a bicycle seller equips a bicycle frame with a stand, and a user can park the bicycle by kicking the stand to swing to touch the ground. In order to make more effective use of the limited environmental space, a horizontal wall-mounted bicycle rack and a vertical wall-mounted bicycle rack are developed, for example, Taiwan utility model patent No. M479884, and U.S. Pat. No. 10,822,045B1 disclose horizontal wall-mounted bicycle racks; Taiwan new utility model patents No. M577390 and M439605 disclose vertical wall-mounted bicycle racks.

The conventional horizontal wall-mounted bicycle rack uses a large number of components and complex mechanism to make swingable arms stay at a locking position and a releasing position. However, when the aforementioned horizontal wall-mounted rack is not used to hang a bicycle, a bracket of the horizontal wall-mounted rack is protruded on the wall and may cause obstacle to the movement of people passing through this area, and even cause dangerous accidental injuries to people.

SUMMARY OF THE INVENTION

An objective of the present invention is to provide a horizontal wall-mounted bicycle rack, and components of the horizontal wall-mounted bicycle rack of the present invention can be manufactured simply and conveniently, and when in use, the horizontal wall-mounted bicycle rack can be operated to be at expanding position to mount a bicycle, and when not in use, the horizontal wall-mounted bicycle rack can be folded to a stowing position, so as to prevent from affecting other's activity and even prevent from dangerous injury caused by accident collision.

In order to achieve aforementioned objective and effect, the present invention provides a horizontal wall-mounted bicycle rack including a fixing main body, an extension assembly, two swingable arms and two adjusting assemblies. The fixing main body includes a mounting wall base and a pivot base which are connected to each other integrally, and the pivot base includes a bottom part, a right side part and a let side part, and two ends of the bottom part are respectively connected to lower ends of the right side part and the left side part to form a pivoting groove, and the pivoting groove has an upward opening and a lateral opening which are in communication with each other. The extension assembly includes a pivot section and an extension plate disposed on two opposite ends thereof, the pivot section is disposed in the pivoting groove, and an axle is pivoted through the right side part, the pivot section and the left side part. The extension assembly is pivotable relative to the pivot base about the axle, and the extension assembly is at an expanding position when the extension assembly is pivoted to move the extension assembly across the lateral opening, and the extension assembly is at a stowing position when the extension assembly is pivoted to move the extension assembly across the upward opening, and the extension plate has accommodation holes formed on two ends thereof, respectively. Each swingable arm has a pivotal rotation section, and the pivotal rotation sections of the two swingable arms are pivoted on two ends of the extension plate, respectively, and each of the two swingable arms has a plurality of adjusting holes formed in an arc arrangement and corresponding in position to the accommodation holes, and each of the two swingable arms comprises a hook. Each adjusting assembly includes an adjusting rod, a buckle ring and a spring, the adjusting rod is inserted into the accommodation hole and two ends of the adjusting rod are exposed out of the accommodation hole, one of the two ends of the adjusting rod is engaged with one of the plurality of adjusting holes, the buckle ring is located on the adjusting rod and extended radially, and the spring is mounted on the adjusting rod and located in the accommodation hole, two ends of the spring is abutted against the buckle ring and a step surface of the accommodation hole, respectively.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

The following embodiments of the present invention are herein described in detail with reference to the accompanying drawings. These drawings show specific examples of the embodiments of the present invention. These embodiments are provided so that this disclosure will be thorough and complete, and will fully convey the scope of the invention to those skilled in the art. It is to be acknowledged that these embodiments are exemplary implementations and are not to be construed as limiting the scope of the present invention in any way. Further modifications to the disclosed embodiments, as well as other embodiments, are also included within the scope of the appended claims.

These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts. As used herein, the singular forms "a", "an" and "the" are intended to include the plural forms as well, unless the context clearly indicates otherwise. As used herein, the term "or" includes any and all combinations of one or more of the associated listed items.

It will be acknowledged that when an element or layer is referred to as being "on" "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

Please refer to FIGS. 1 to 3, and 7. A horizontal wall-mounted bicycle rack 100 includes a fixing main body 200, an extension assembly 300, two swingable arms 400, and two adjusting assemblies 500. The fixing main body 200 includes a mounting wall base 210 and a pivot base 220 which are integrally connected to each other, and the pivot base 220 includes a bottom part 221, a right side part 222 and a left side part 223, and two ends of the bottom part 221 are connected to lower ends of the right side part 222 and the left side part 223, respectively, so as to form and surround a pivoting groove 224. The pivoting groove 224 has an upward opening 225 and a lateral opening 226 in communication with each other. The mounting wall base 210 is configured to be inserted through and mounted on a wall by a locking device.

The extension assembly 300 includes a pivot section 310 and an extension plate 320 formed on opposite ends thereof, and the pivot section 310 is located in the pivoting groove 224 and is pivoted with the right side part 222, the pivot section 310 and the left side pan 223 by an axle 330. The extension assembly 300 can be pivotally rotated relative to the pivot base 220 about the axle 330 to move across the lateral opening 226, so that the extension assembly 300 is at an expanding position; when the extension assembly 300 is moved across the upward opening 225, the extension assembly 300 is at a stowing position. The extension plate 320 has accommodation holes 321 formed on two ends thereof, respectively.

Each swingable arm has a pivotal rotation section 401, and the pivotal rotation sections 401 of the two swingable arms 400 are pivoted on two ends of the extension plate 320, respectively. Each swingable arm 400 has a plurality of adjusting holes 410 formed in an arc arrangement and corresponding in position to the accommodation holes 321, and each swingable arm includes a hook 420. The pivoting relationship between the swingable arm 400 and the extension plate 320 can be performed by a rivet or bolt.

Each adjusting assembly 500 includes an adjusting rod 510, a buckle ring 520 and a spring 530. The adjusting rod 510 is inserted into the accommodation hole 321, and two ends of the adjusting rod 510 are exposed out of the accommodation hole 321. One of the ends of the adjusting rod 510 is engaged with one of the plurality of adjusting holes 410. The buckle ring 520 is located on the adjusting rod 510 and extended radially, the spring 530 is mounted on the adjusting rod 510 and located in the accommodation hole 321, and two ends of the spring 530 is abutted against the buckle ring 520 and a step surface 322 of the accommodation hole 321, respectively.

When the horizontal wall-mounted bicycle rack 100 of the present invention is in use, the adjusting rod 510 can be pulled to separate from the adjusting hole 410, and during the process of pulling the adjusting rod 510, the buckle ring 520 compresses the spring 530 to store elastic energy, so that the swingable arm 400 can be swung in a curved path relative to the extension plate 320, and after the swingable arm 400 is swung to an appropriate use angle for hanging bicycle (not shown in figures), the adjusting rod 510 can be released to make the spring 530 push and abut against the buckle ring 520, so that the spring 530 pushes the adjusting rod 510 back to its former position to engage with the adjusting hole 410 corresponding to the use angle. Through above-mentioned operations, the angular adjustment of the swingable arm 400 is completed, and the bicycle can be hung on the hooks 420. Through the above-mentioned operations, the swingable arms 400 can be swung synchronously or individually to adjust the horizontal wall-mounted bicycle rack 100 based on gravity center of the bicycle and angle of bicycle frame, so that the gravity center of the bicycle can be closer the horizontal wall-mounted bicycle rack 100, and the bicycle can be hung well stably.

When not in use, the horizontal wall-mounted bicycle rack 100 can be unfolded to stow, and the extension assembly 300 outwardly protruded from the wall across the lateral opening 226 and at the expanding position can be pivoted relative to the pivot base 220 about the axle 330, to push the extension plate 320 or the swingable arm 400 in an upward direction and toward the wall, so that the extension assembly 300 is swung across the upward opening 225 to be at the stowing position from the position across the lateral opening 226. In an upward extension status at the stowing position, the extension assembly 300 can be prevented from excessive protruding outside the wall, so that the stowed extension assembly 300 can be prevented from affecting other's activity and dangerous injury caused by accident collision. The aforementioned operations can be performed reversely to switch the position of the extension assembly 300 from the stowing position to the expanding position.

The detailed features of and assembling relationships between the components of the present invention will be illustrated in detail in following paragraphs. Please refer to FIGS. 1, 2 and 7. The bottom part 221 has a dodge opening 227 connected with the pivot base 220, and the dodge opening 227 is configured to dodge the pivot section 310 when the position of the extension assembly 300 is switched from the expanding position to the stowing position, so that the distal end of the pivot section 310 is prevented from directly colliding the bottom part 221, and the operation and process of switching and rotating the extension assembly 300 can be performed smoothly.

Figure 1:
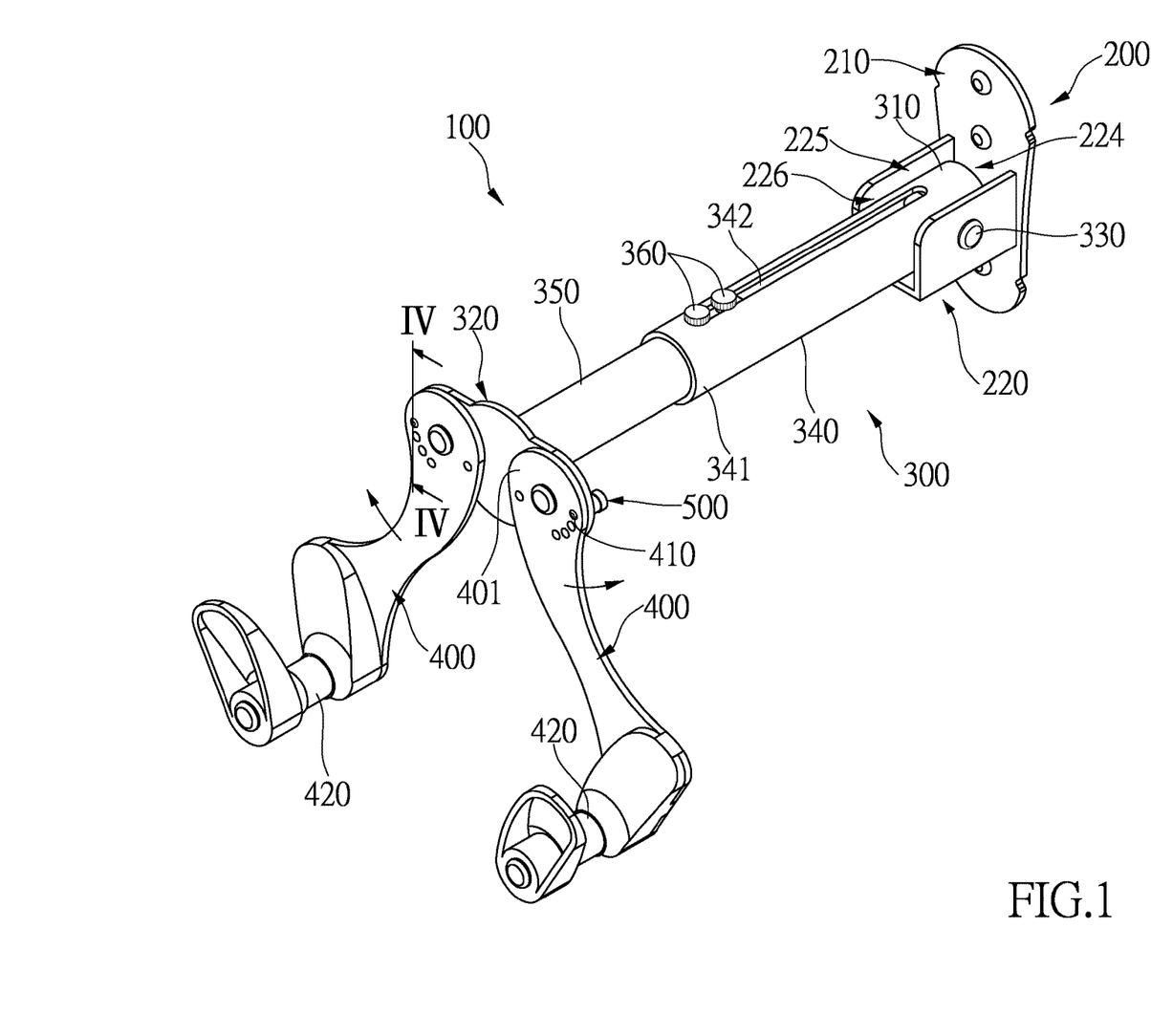
FIG. 1 is a perspective assembly view of a horizontal wall-mounted bicycle rack of the present invention.
Figure 2:
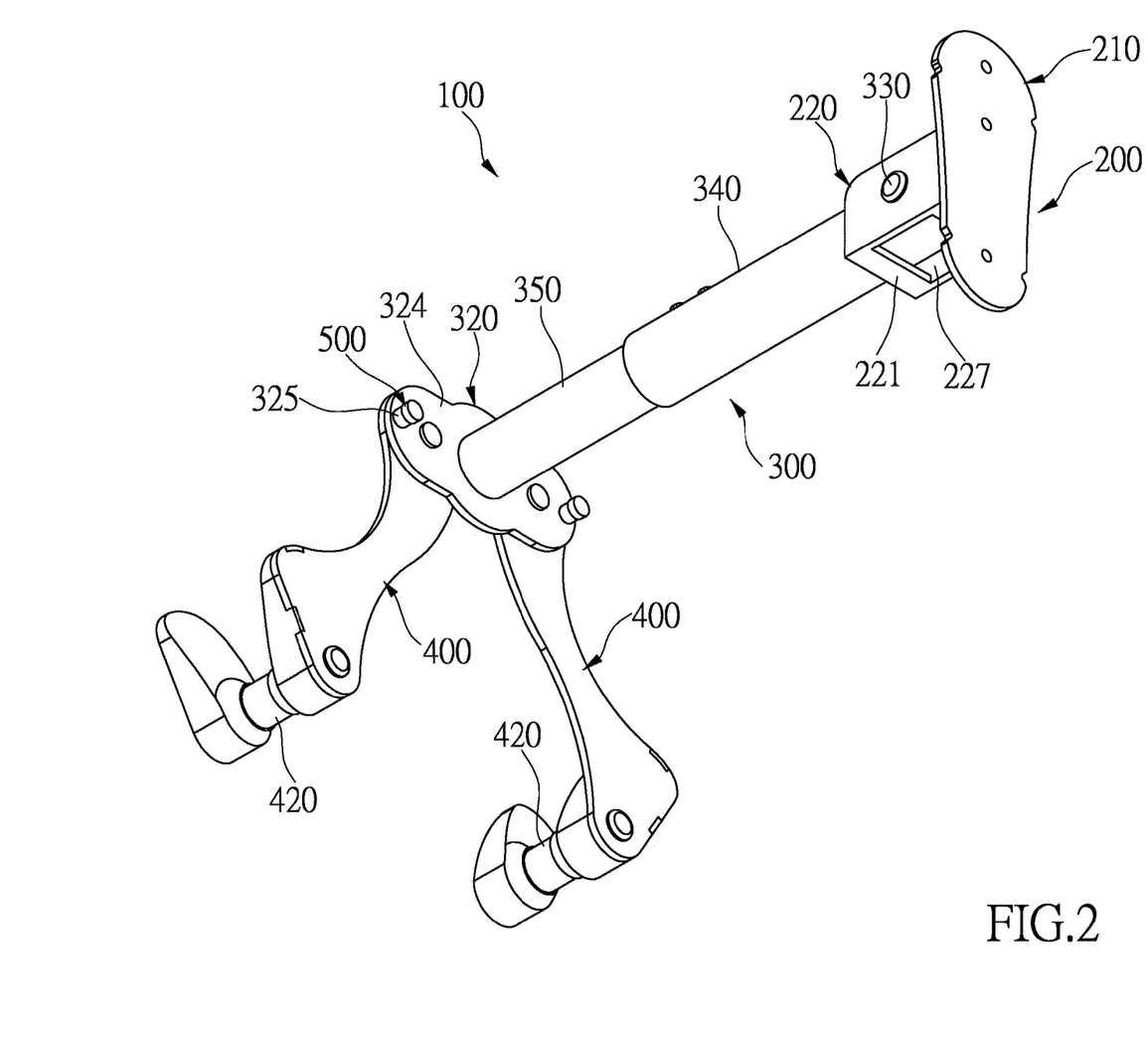
FIG. 2 is a perspective assembly view of a horizontal wall-mounted bicycle rack of the present invention when viewed from another angle.
Figure 3:
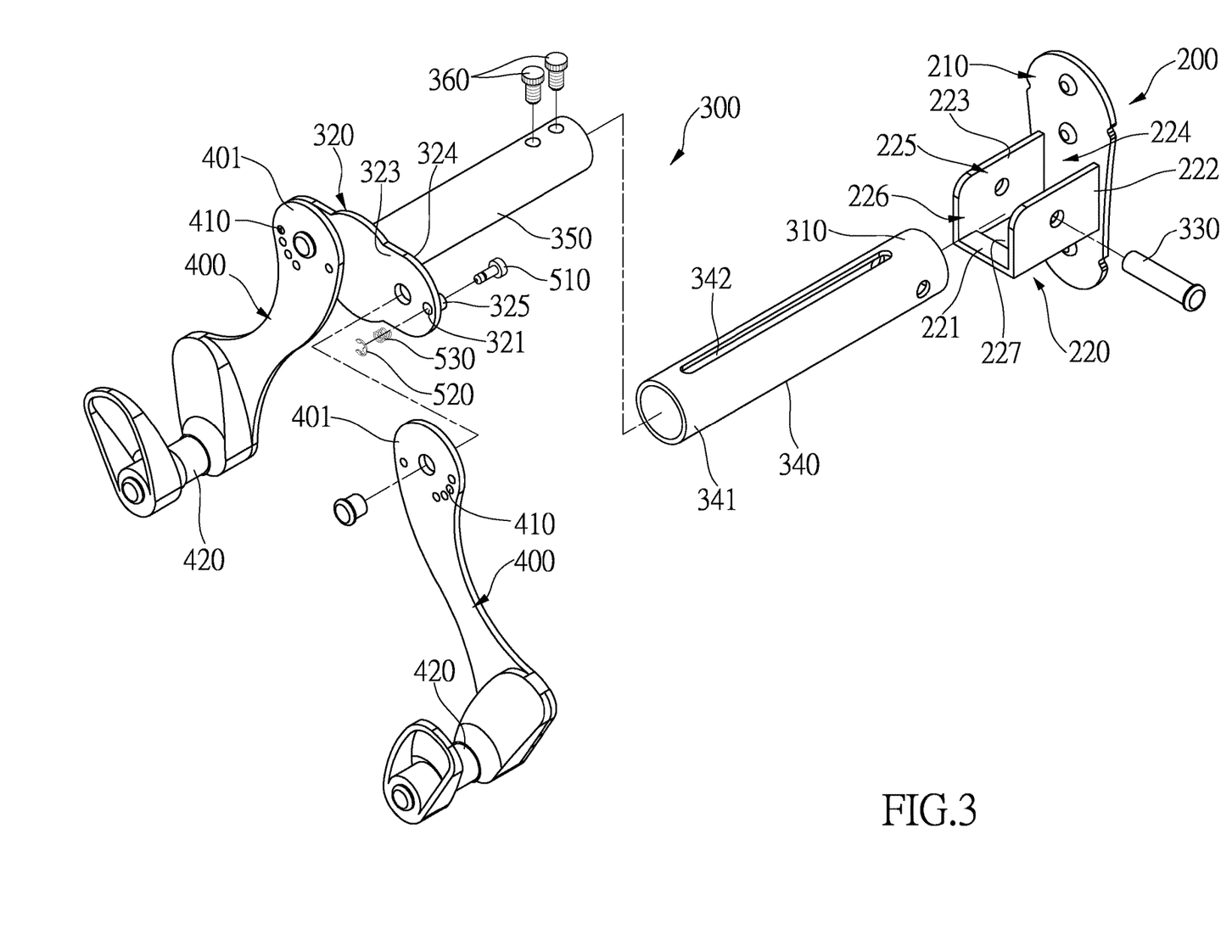
FIG. 3 is a perspective exploded view of a horizontal wall-mounted bicycle rack of the present invention.
Figure 6:
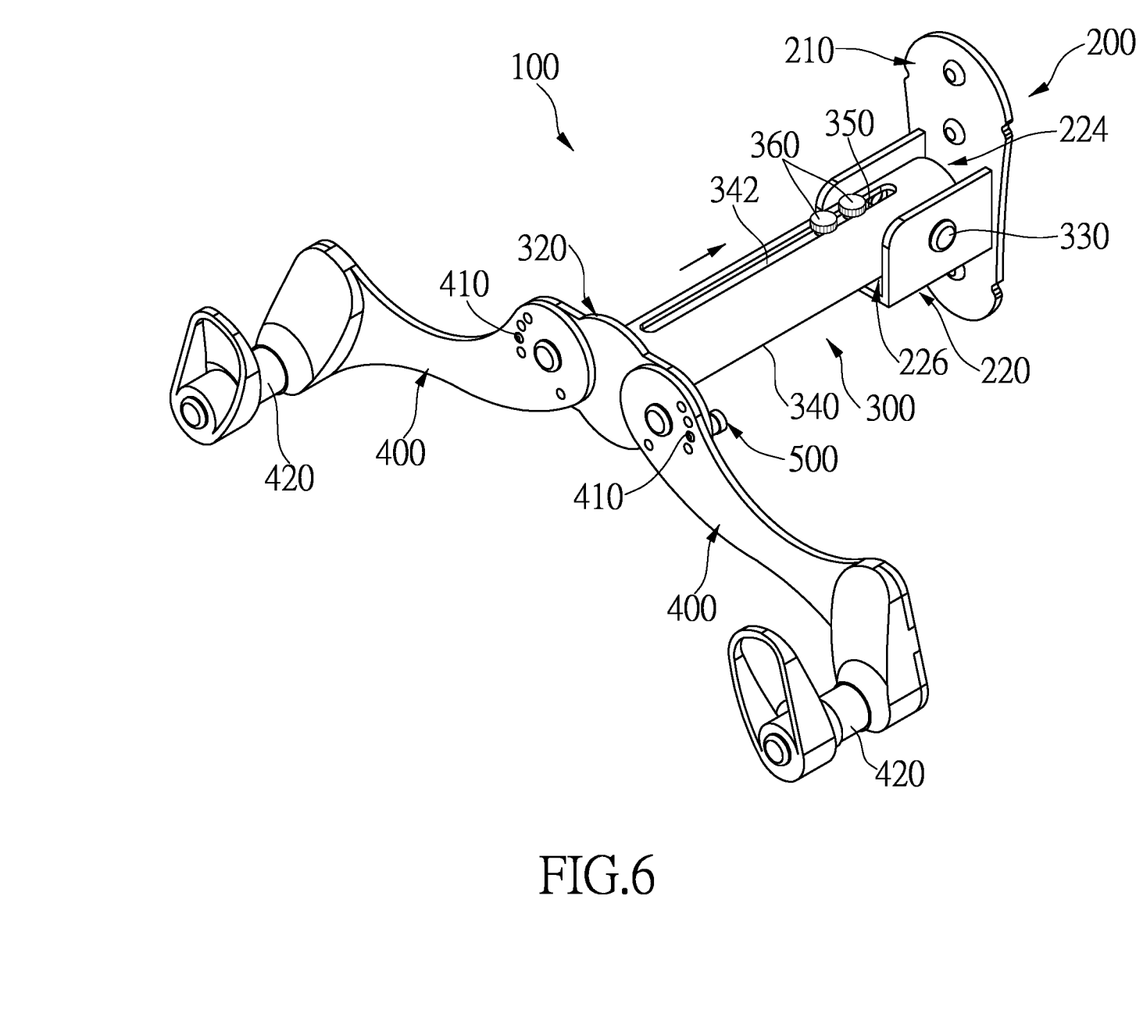
FIG. 6 is a schematic view showing an operation of adjusting an extension assembly to retract inwardly a part of an inner tube inside an outer tube, according to the present invention.
Figure 7:
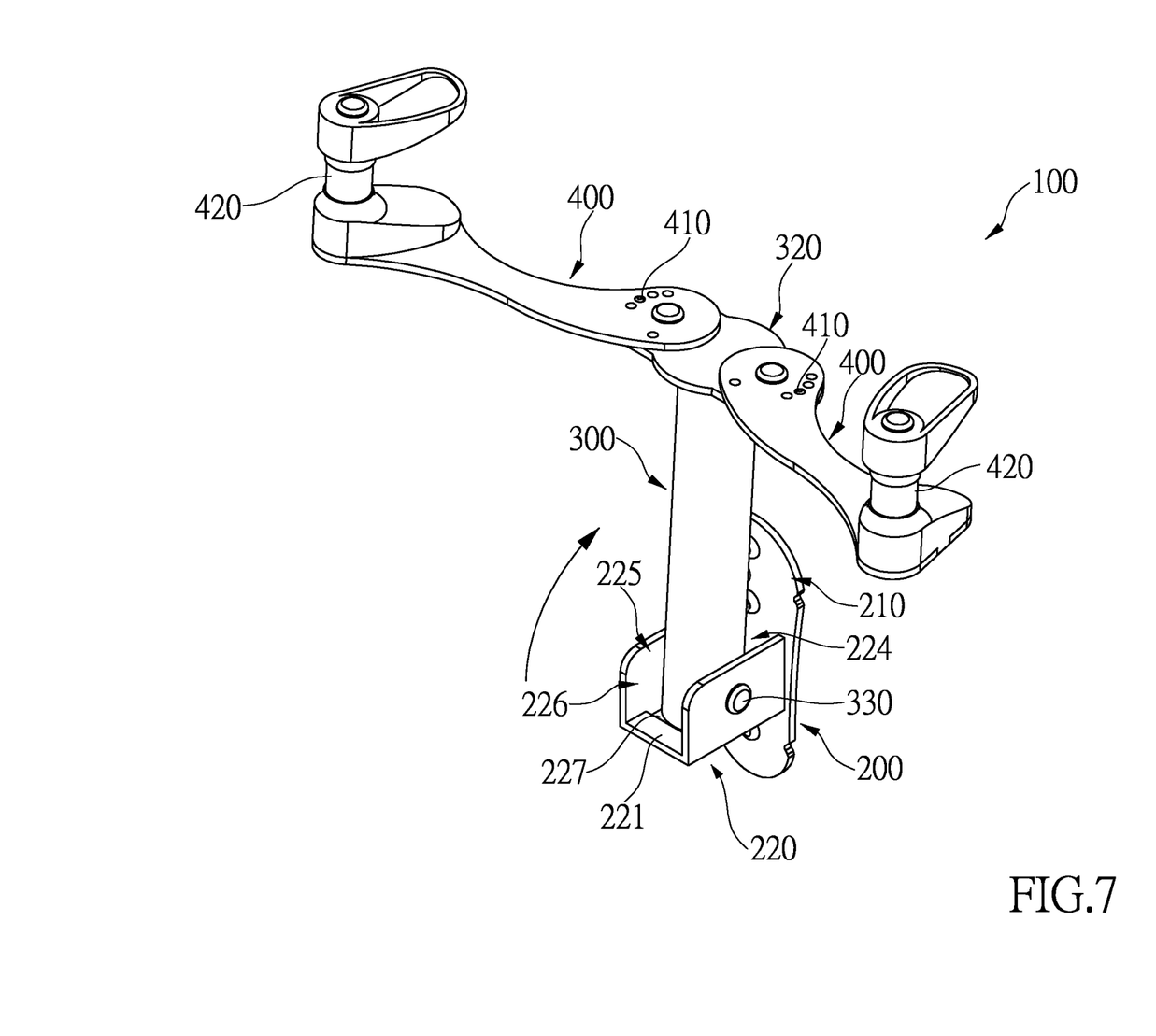
FIG. 7 is a schematic view of a horizontal wall-mounted bicycle rack which is folded to stow, according to the present invention.

Please refer to FIGS. 3 and 6. The extension assembly 300 includes an outer tube 340, an inner tube 350 and a plurality of extension bolts 360. The outer tube 340 includes the pivot section 310 and an extension section 341 disposed on two opposite ends thereof, and a long hole 342 cut through a lateral side thereof and facing upwardly at the expanding position. The two ends of the long hole 342 are extended toward the pivot section 310 and the extension section 341, respectively. An end of the inner tube 350 is movably mounted with the outer tube 340, and other end of the inner tube 350 is fixed with the extension plate 320, and the plurality of extension bolts 360 are inserted into the long hole 342 in interval and movably screwed with the inner tube 350, and movement of the plurality of extension bolts 360 are limited in the long hole 342 when the inner tube 350 is telescopically moved relative to the outer tube 340, so that the inner tube 350 can be prevented from being separated from the outer tube 340. The use range of the extension assembly 300 of the present invention can be changed according to the width dimension of the bicycle, and the extension bolt 360 can be rotate and loose to not abutted and fastened with the periphery of the long hole 342, so that the inner tube 350 can be outwardly pulled to slide relative to the outer tube 340, or a part of the inner tube 350 can be inwardly pushed into the outer tube 340, and the extension bolts 360 are then screwed to abutted against and fasten with the periphery of the long hole 342, the inner tube 350 is unable to slide relative to the outer tube 340. As a result, the axial length of the extension assembly 300 can be changed and adjusted according to the width dimension of the bicycle.

Figure 4:
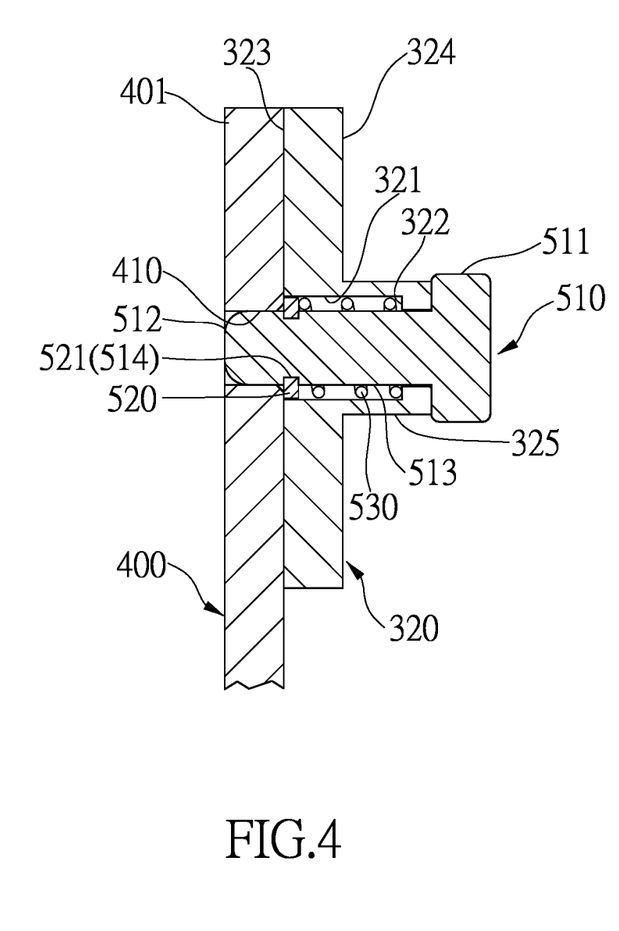
FIG. 4 is a schematic cross-sectional view taken along IV-IV of FIG. 1, according to the present invention.
Figure 5:
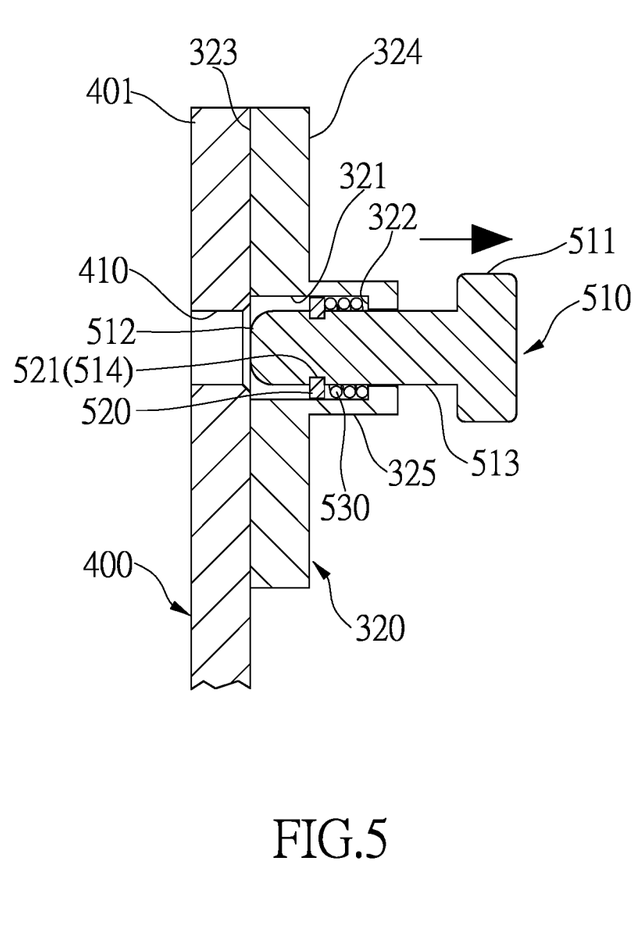
FIG. 5 is a schematic view showing an operation of pulling an adjusting rod to move, according to FIG. 4.

Please refer to FIGS. 3 to 5. The extension plate 320 has an outer surface 323 and an inner surface 324 opposite to each other, and two pins 325 protruded in interval on the inner surface 324, and the accommodation holes 321 are cut through the two pins 325 to the outer surface 323, and the step surfaces 322 are formed inside the pins 325, respectively. The adjusting rod 510 includes a pull section 511, an engaging section 512, and a middle section 513 connected to the pull section 511 and the engaging section 512. The pull section 511 has a radial dimension greater than a radial dimension of the middle section 513 and is abutted with the end surfaces of the two pins 325, the middle section 513 is movably inserted into the accommodation hole 321 and mounted with the spring 530, and the engaging section 512 is configured to engage one of the plurality of adjusting holes 410. The middle section 513 has a latching groove 514 annularly formed thereon, and buckle ring 520 is fastened in the latching groove by an inner ring surface 521 thereof. In order to operate the adjusting rod 510, the pull section 511 of the pin 325 exposed out can be directly pulled to make the engaging section 512 release from the engaging status with the adjusting hole 410, and during the above-mentioned process, the buckle ring 520 compresses the spring 530 to store force, and after the adjusting operation is completed, the spring 530 can be released to push the adjusting rod 510 back to its former position, and the engaging section 512 engages with the appropriate adjusting hole 410. Therefore, the horizontal wall-mounted bicycle rack of the present invention is very convenient in use.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A horizontal wall-mounted bicycle rack, comprising:
    a fixing main body comprising a mounting wall base and a pivot base which are connected to each other integrally, and wherein the pivot base comprises a bottom part, a right side part and a left side part, and two ends of the bottom part are respectively connected to lower ends of the right side part and the left side part to form a pivoting groove, and the pivoting groove has an upward opening and a lateral opening which are in communication with each other;
    an extension assembly comprising a pivot section and an extension plate disposed on two opposite ends thereof, wherein the pivot section is disposed in the pivoting groove, and an axle is pivoted through the right side part, the pivot section and the left side part, the extension assembly is pivotable relative to the pivot base about the axle, and the extension assembly is at an expanding position when the extension assembly is pivoted to move the extension assembly across the lateral opening, and the extension assembly is at a stowing position when the extension assembly is pivoted to move the extension assembly across the upward opening, and the extension plate has accommodation holes formed on two ends thereof, respectively;
    two swingable arms, wherein each of the two swingable arms has a pivotal rotation section, and the pivotal rotation sections of the two swingable arms are pivoted on two ends of the extension plate, respectively, and each of the two swingable arms has a plurality of adjusting holes formed in an arc arrangement and corresponding in position to the accommodation holes, and each of the two swingable arms comprises a hook; and
    two adjusting assemblies, wherein each of the two adjusting assemblies comprises an adjusting rod, a buckle ring and a spring, and the adjusting rod is inserted into the accommodation hole and two ends of the adjusting rod are exposed out of the accommodation hole, one of the two ends of the adjusting rod is engaged with one of the plurality of adjusting holes, the buckle ring is located on the adjusting rod and extended radially, and the spring is mounted on the adjusting rod and located in the accommodation hole, two ends of the spring is abutted against the buckle ring and a step surface of the accommodation hole, respectively.

2. The horizontal wall-mounted bicycle rack according to claim 1, wherein the bottom part has a dodge opening connected with the pivot base, and the dodge opening is configured to dodge the pivot section when the extension assembly is switched from the expanding position to the stowing position.

3. The horizontal wall-mounted bicycle rack according to claim 1, wherein the extension assembly comprises an outer tube, an inner tube and a plurality of extension bolts, the outer tube comprises the pivot section and an extension section disposed on two opposite ends thereof, and a long hole cut through a lateral side thereof and face upwardly at the expanding position, wherein the two ends of the long hole are extended toward the pivot section and the extension section, respectively, an end of the inner tube is movably mounted with the outer tube, and other end of the inner tube is fixed with the extension plate, and the plurality of extension bolts are inserted into the long hole in interval and movably screwed with the inner tube, and movement of the plurality of extension bolts are limited in the long hole when the inner tube is telescopically moved relative to the outer tube.

4. The horizontal wall-mounted bicycle rack according to claim 1, wherein the extension plate has an outer surface and an inner surface opposite to each other, and two pins protruded in interval on the inner surface, and the accommodation holes are cut through the two pins to the outer surface, and the step surfaces are formed inside the pins, respectively.

5. The horizontal wall-mounted bicycle rack according to claim 4, wherein the adjusting rod comprises a pull section, an engaging section, and a middle section connected to the pull section and the engaging section, the pull section has a radial dimension greater than a radial dimension of the middle section and is abutted with the end surfaces of the two pins, the middle section is movably inserted into the accommodation hole and mounted with the spring, and the engaging section is configured to engage one of the plurality of adjusting holes.

6. The horizontal wall-mounted bicycle rack according to claim 5, wherein the middle section has a latching groove annularly formed thereon, and buckle ring is fastened in the latching groove by an inner ring surface thereof.

\* \* \* \* \*